Sept. 17, 1940.   A. F. PIEPER   2,214,774
UNITARY DENTAL APPARATUS
Filed April 21, 1938   5 Sheets-Sheet 3

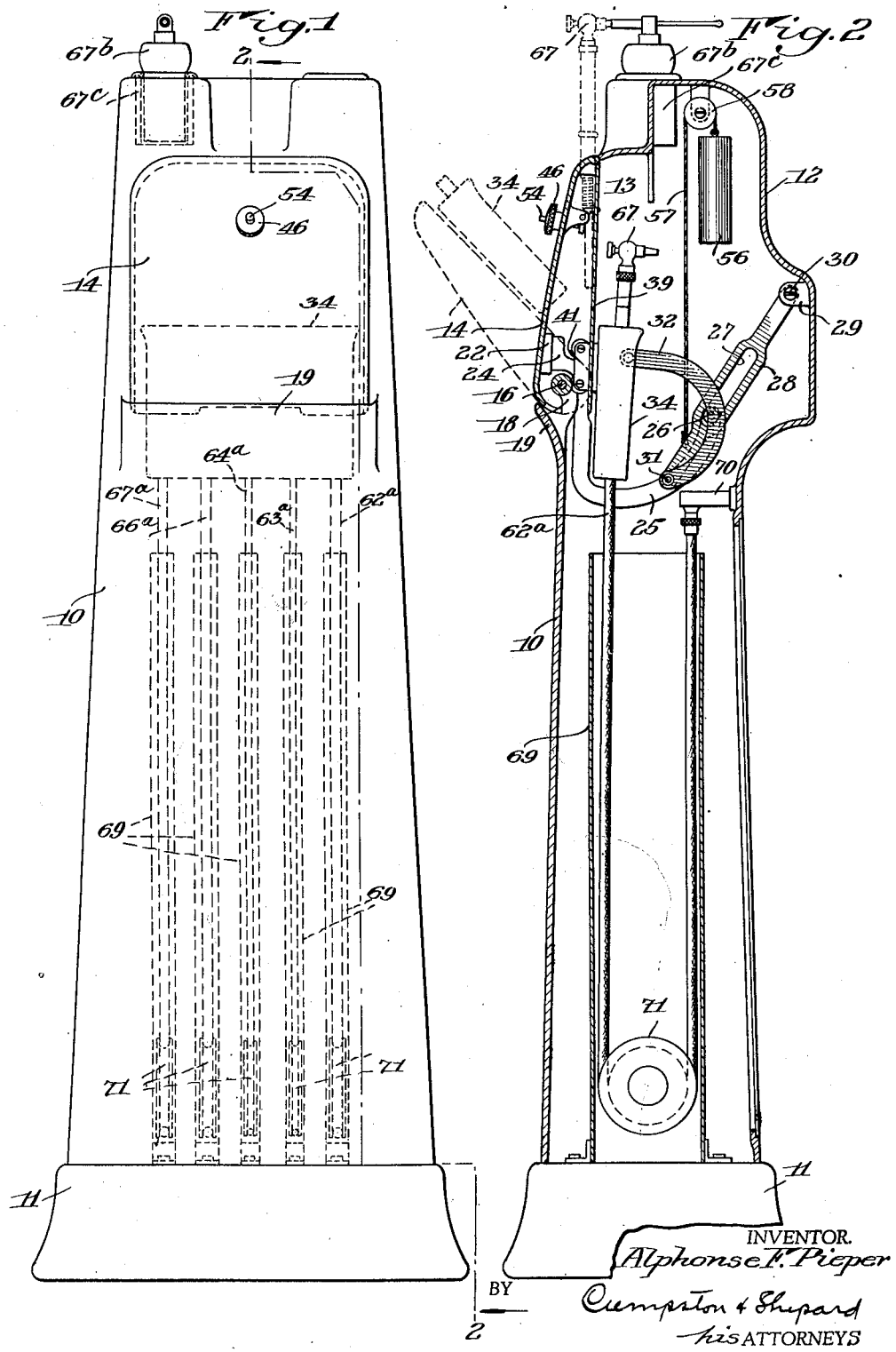

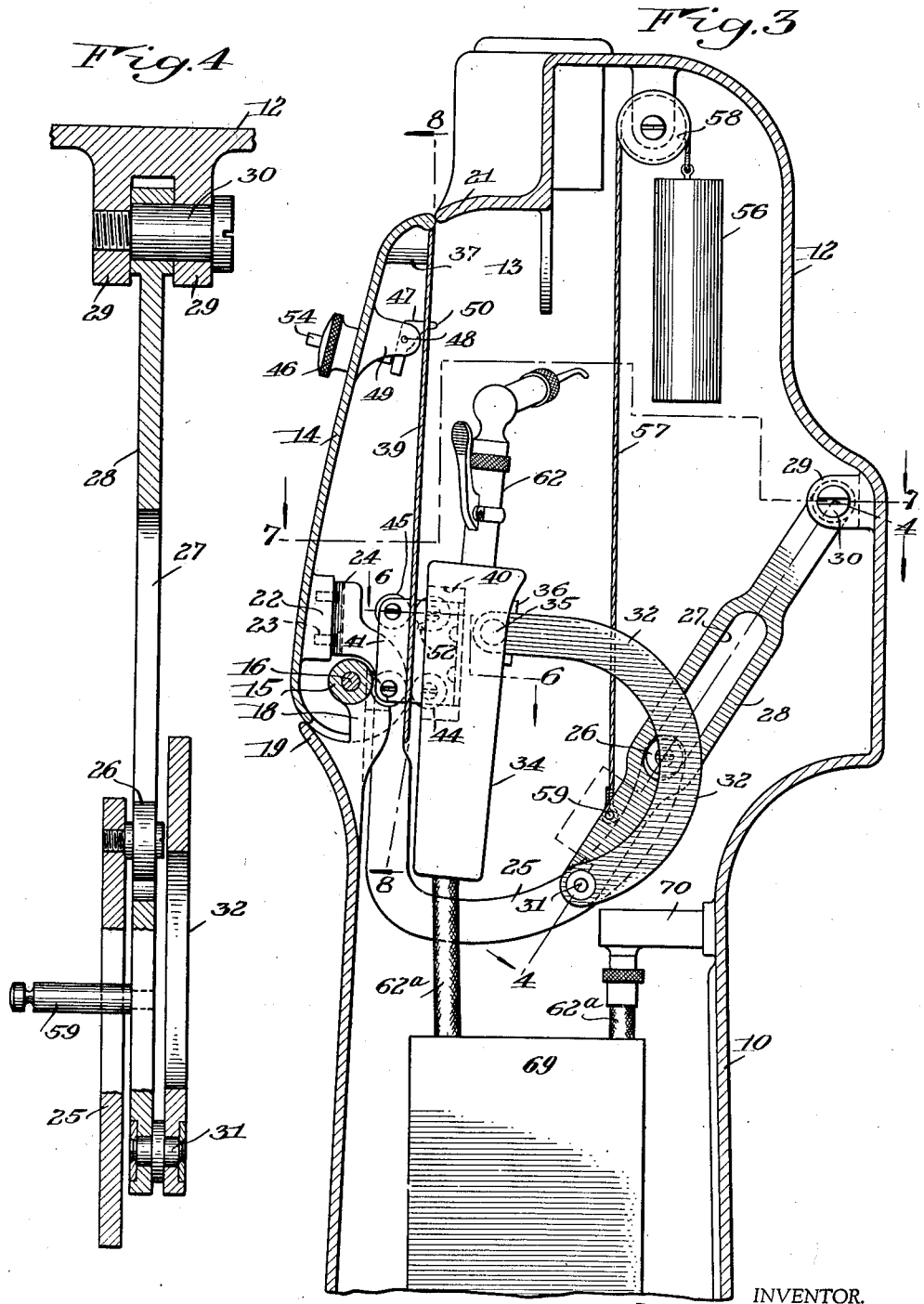

INVENTOR.
Alphonse F. Pieper
BY Cumpston & Shepard
his ATTORNEYS

Sept. 17, 1940.   A. F. PIEPER   2,214,774
UNITARY DENTAL APPARATUS
Filed April 21, 1938   5 Sheets-Sheet 4
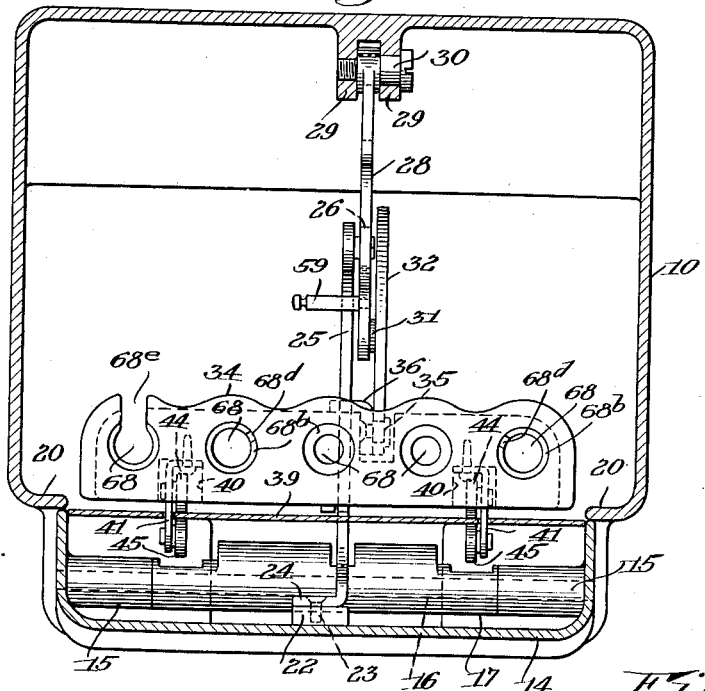
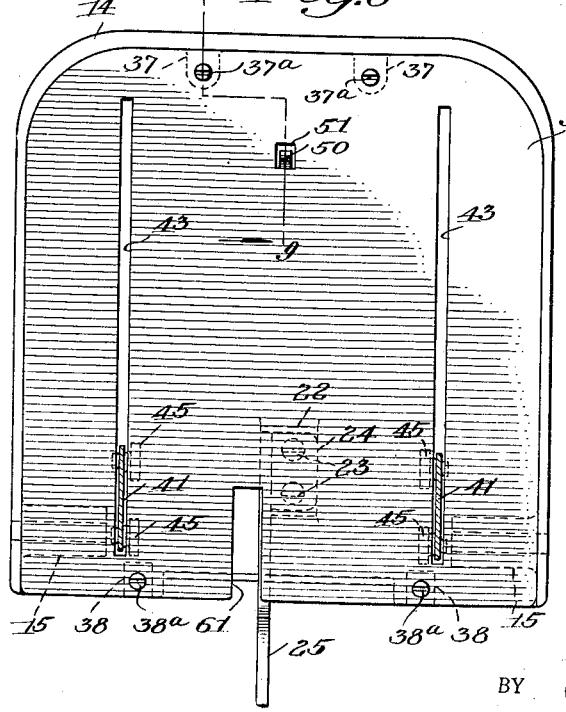
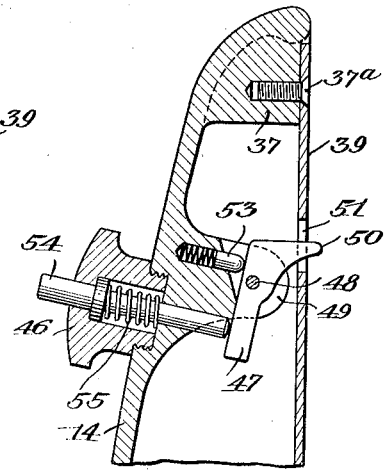
INVENTOR.
Alphonse F. Pieper
BY Cumpston & Shepard
his ATTORNEYS Sept. 17, 1940.   A. F. PIEPER   2,214,774
UNITARY DENTAL APPARATUS
Filed April 21, 1938   5 Sheets-Sheet 5
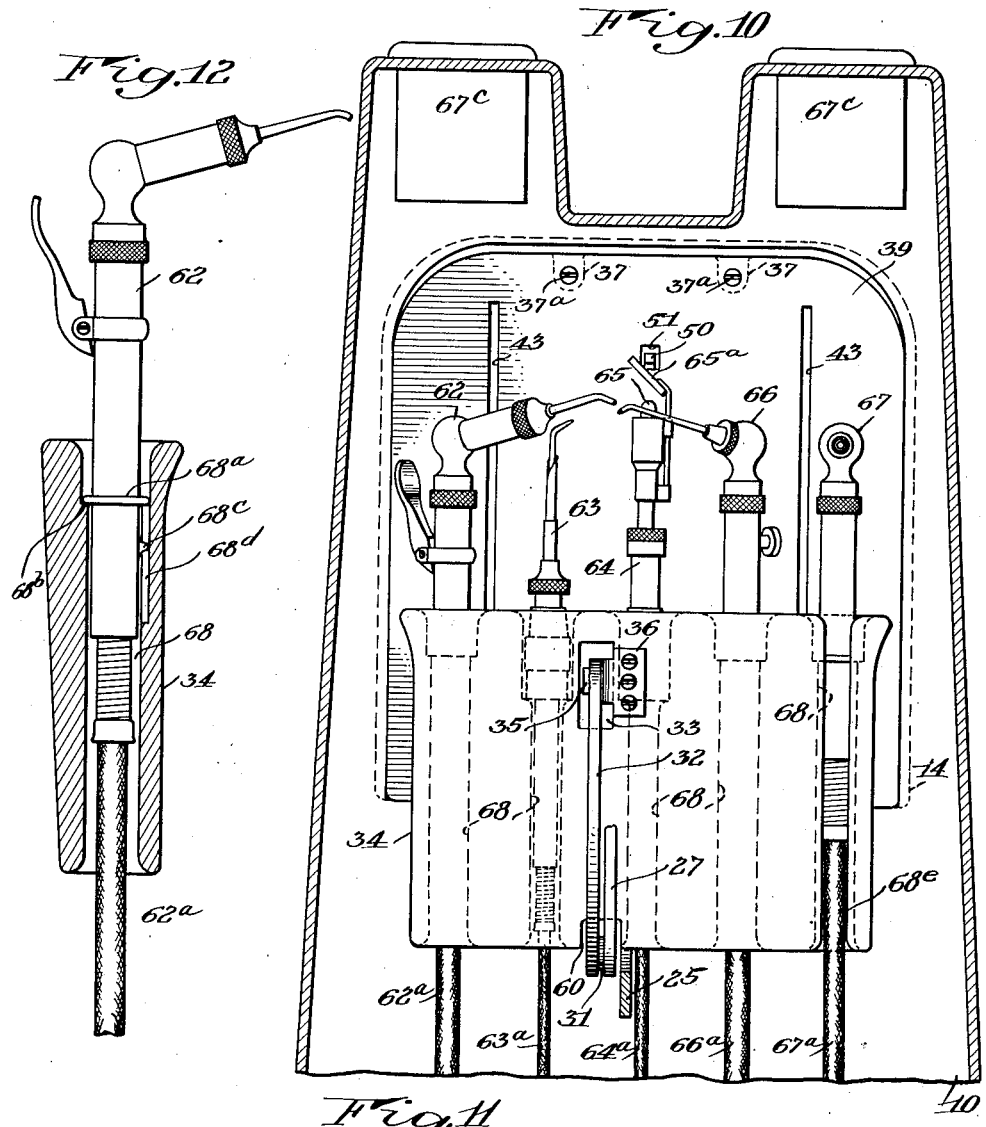
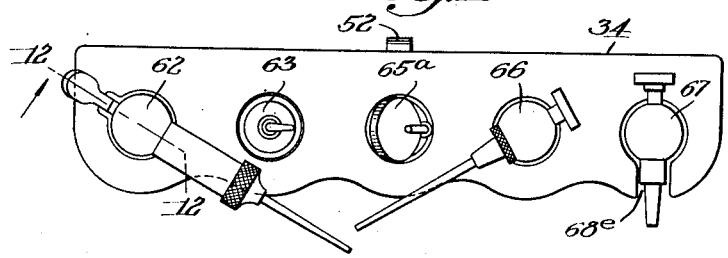
INVENTOR.
Alphonse F. Pieper
BY Cumpston & Shepard
his ATTORNEYS Patented Sept. 17, 1940

2,214,774

UNITED STATES PATENT OFFICE 2,214,774

UNITARY DENTAL APPARATUS

Alphonse F. Pieper, Brighton, N. Y.

Application April 21, 1938, Serial No. 203,366

13 Claims. (Cl. 32—22)

The present invention relates to dental apparatus such, for example, as a dental equipment stand or unit for supporting various fixtures and articles of equipment to be used by the dentist from time to time.

The invention has for one object to provide improved unitary and simplified means for effectively protecting and controlling various electrical, compressed air, water, and gas appliances, and which is designed to be manufactured, installed, and maintained at a relatively low cost.

A further object of the invention is to provide on a suitable support such, for example, as a dental stand, a normally concealed holder or carrier for a plurality of instruments, in combination with an improved and simplified mechanism for positioning the holder to present the instruments ready for use by the dentist.

A further object of the invention is to provide in conjunction with a dental stand, a compartment for a variety of instruments, and particularly the hand instruments generally used by the dentist, and within which compartment is normally disposed improved means for supporting the instruments in juxtaposition one relative to another, together with a simple and improved mechanism for operating said supporting means to withdraw the instruments from the compartment and to present them for convenient and selective use by the operator.

To these and other ends the invention resides in certain improvements and combinations of parts, all as will be hereinafter more fully described, the novel features being pointed out in the claims at the end of the specification.

In the drawings:

Fig. 1 is a front elevation of a dental stand to which the invention is shown applied;

Fig. 2 is a vertical sectional elevation substantially on line 2—2 of Fig. 1;

Fig. 3 is a sectional elevation somewhat similar to Fig. 2, but drawn to an enlarged scale;

Fig. 4 is a sectional view on line 4—4 of Fig. 3, drawn to an enlarged scale;

Fig. 7 is a horizontal section through the dental stand, taken substantially on line 7—7 of Fig. 3;

Fig. 8 is a sectional elevation on line 8—8 of Fig. 3;

Fig. 9 is a fragmentary sectional elevation substantially on line 9—9 of Fig. 8;

Fig. 10 is a vertical sectional view through the upper portion of the dental stand looking in the direction of the instrument holder shown in Fig. 3, with part of the means for operating the holder removed;

Fig. 11 is a plan view of the instrument holder shown removed from the standard, and Fig. 12 is a vertical section through the instrument holder substantially on the line 12—12 of Fig. 11 with the instruments shown in normal position thereon.

The same reference numerals throughout the several views indicate the same parts.

Figure 5:
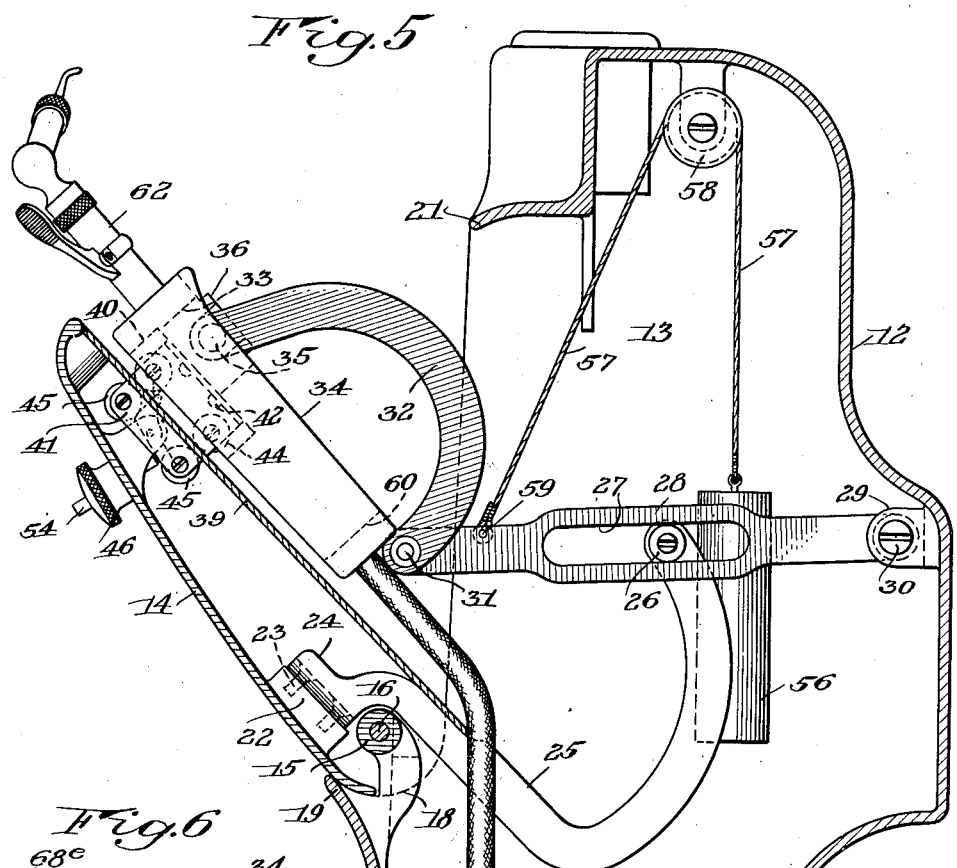
Fig. 5 is a sectional elevation similar to Fig. 3, with the closure for the instrument holding compartment in open position and with the holder for the instruments shown in raised position.

The preferred embodiment of the invention, disclosed herein by way of illustration, comprises a hollow supporting column or standard 10 resting on a base 11 of any suitable design. The upper end 12 of the column is provided with a recess or compartment 13 for housing and protecting various instruments or dental appliances to be used by the operator when needed. The compartment is provided with a closure 14 having on its opposite side walls near its lower edge inwardly extending tubular bearing portions 15 through which a pintle or pivot member 16 is extended. The pivot member is also extended through and carried by a tubular bearing member 17 supported by an elongated upstanding member 18 on the inner face of the outwardly turned front wall portion 19 of the column, Figs. 3 and 7.

The side walls of the column are provided with inwardly turned front wall portions 20 which, taken with the lower and upper wall portions 19 and 21 of the column, respectively, form a seat for the closure and cooperate with the latter when in closed position to protect the compartment 13 against the entrance thereto of dust and other foreign material, whereby to protect the instruments within said compartment.

The closure 14 has formed on its inner face a lug 22 on which is secured, by means of screws 23, the foot 24 of an operating element 25, which is extended from the closure downwardly within the column and rearwardly and upwardly therein to form a substantially U-shaped member, as shown in Figs. 3 and 5. The operating element 25 is provided on its inner end with a roller 26, disposed within a slot 27 of an actuating member, such for example as the lever 28 having its rear end supported between a pair of lugs 29 on the rear wall of the column by a pivot pin 30 carried by said lugs, Figs. 5 and 7. The outer end of the lever is connected by means of a pivot pin 31 with a substantially U-shaped actuating member 32 in the form of a link, the upper end of which is extended within a recess 33 of an instrument holder or carrier 34, the link being connected with the holder by means of a pivot pin 35 carried by an L-shaped bracket 36 suitably connected with the holder and having one leg extended within the recess 33 thereof, as shown in Fig. 7.

Figure 6:
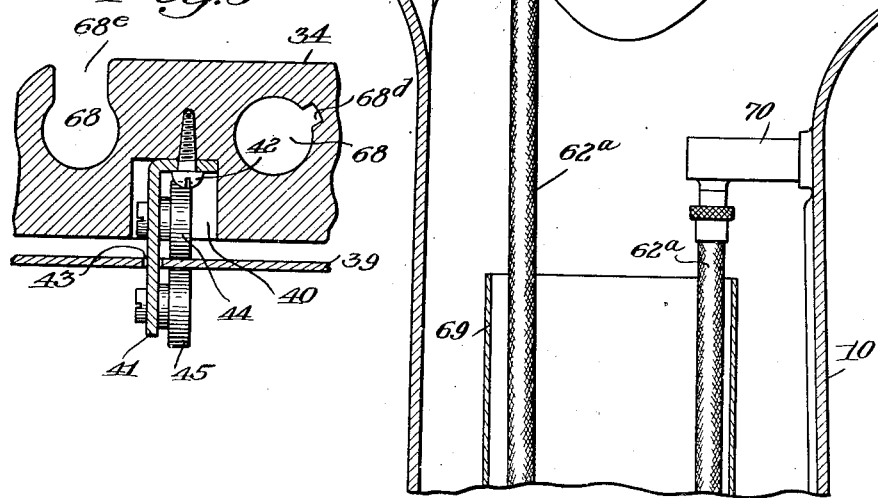
Fig. 6 is a fragmentary horizontal section through the instrument holder taken on line 6—6 of Fig. 3.

The closure 14 is provided on its inner face with upper and lower lugs 37 and 38, respectively, upon which a guide plate 39 for the instrument holder is secured by means of screws 37a and 38a, Figs. 7, 8 and 9. The guide plate serves in part as a support for the instrument holder when moving the latter relative to the closure through the medium of the operating element 25, lever 28 and link 32, as described hereinafter. The front face of the holder is provided with spaced pockets 40 within each of which is disposed the rear end of a forwardly projecting arm 41 connected with the instrument holder by means of a plurality of screws 42, Figs. 5, 6 and 7. The arms 41 are extended through slots 43 in the guide plate 39 and each arm carries a pair of inner rollers 44 and a pair of outer rollers 45, the former engaging the rear face of the guide plate and the latter the front face thereof, as shown in Fig. 6, said rollers travelling on the guide plate when the instrument holder is moved between the normal position shown in Fig. 3 and the outer service position shown in Fig. 5.

The closure is provided with means for opening the same which may be of any preferred design but which preferably comprises a knob 46 threadedly connected with the closure, as shown in Fig. 9. Means is also provided for automatically locking the instrument holder in the outermost position shown in Fig. 5, to which it is moved upon opening the closure. The locking means preferably comprises a latching dog 47 pivotally mounted at 48 between a pair of lugs 49 on the inner wall of the closure. The latching dog is provided at its upper end with a finger-like portion 50 which extends rearwardly through an opening 51 in the guide plate 39 and which lies in the path of a lug 52 on the front face of the instrument holder, the lug moving past the latching dog upon movement of the instrument holder to the position shown in Fig. 5, in which the holder is maintained by the dog, the latter being actuated and held in operating position by a spring pressed member 53, as shown in Fig. 9. Release of the latching dog to free the instrument holder for return to normal position when it is desired to swing the closure back to normal position can readily be effected by using the thumb or finger to press inwardly on a plunger 54 extending through the operating knob 46 and engaging the lower end of the latching dog, as best shown in Fig. 9, the plunger when released being returned to normal position by a spring 55 housed within the operating knob 46.

It will be understood that upon swinging the closure from the position shown in Fig. 3 to the open position shown in Fig. 5 that the instrument holder will be moved from the compartment 13 outwardly on the closure by the action of the link 32, lever 28 and U-shaped operating element 25 in response to the movement of the latter by the closure. In other words, since the operating element is fixed to the closure, its rear end will be elevated during movement of the closure to open position, with the result that the roller 26 carried by the operating element will travel within the slot 27 of the actuating lever 28 to raise the latter from the lowered position shown in Fig. 3 to the elevated substantially horizontal position shown in Fig. 5, for the purpose of moving the link connected with the closure. During elevation of the instrument holder in the manner described the rollers 44 and 45 will travel on the guide plate and facilitate movement of the holder relative thereto.

As previously stated, the instrument holder when approaching the position shown in Fig. 5 will automatically become locked in said position by the spring pressed dog 47 and in which position it will remain until the dog is released by pressing inwardly on the plunger 54, at which time the closure can be returned to normal position. Upon return of the closure to closed position the instrument holder will be moved downwardly on the closure and into the compartment 13 by the action of gravity.

However, in order to make it comparatively easy to operate the closure as well as to steady and prevent a too rapid return of the instrument holder and its operating parts to normal position thereon upon moving the closure to the position shown in Fig. 3, suitable counterbalancing means has been provided such, for example, as a weight 56 attached to one end of a cable 57 supported by a pulley 58, the opposite end of the cable being connected with a pin 59 suitably secured upon and projecting laterally from the lever 28 of the mechanism for elevating the instrument holder upon opening the closure.

In order to provide clearance for the connected ends of the lever 28 and link 32 of the instrument holder operating mechanism, when the closure is moved to open position, the holder is notched or cut away as shown at 60 in Figs. 5 and 10. Furthermore the guide plate 39 is slotted at 61, Fig. 8, to afford clearance for said lever and link ends when the lever and the link are being moved up and down by movement of the closure to and from open position.

The holder 34 is adapted to receive the handles or mountings of a number of different instruments such, for example, as the hot air syringe 62, a cautery 63, a hand piece 64 for an examination lamp 65 and mirror 65a, or other miscellaneous detachable instruments, a hot water syringe 66 and an air nozzle 67 to be used in selective cooperation with a pair of atomizer bottles 67a, only one of which is shown. The air nozzle is also indicated by dotted lines in Fig. 2 and is shown connected with the atomizer bottle 67b disposed within one of the receptacles 67c supported within the upper end of the column 10, the receptacles being provided with the usual means, not shown, for heating the contents of the bottles. The instrument holder 34 is provided with openings 68 for the reception of the instruments or the mountings or handles therefor. The handle of the hot air syringe 62 is shown in one of the openings and has an enlarged portion 68a seated on the annular shoulder 68b partly surrounding said opening, said handle being prevented from turning within the opening by a projection 68c for engagement with the side walls of a slot 68d of the holder, Fig. 12, the same being true of the hot water syringe 66. The opening of the holder within which the handle of the air nozzle 67 is disposed has a passage 68e to permit the supply conduit leading to the air nozzle to be moved laterally and rearwardly from the holder when withdrawing said nozzle therefrom to shift it to the position indicated by dotted lines in Fig. 2, in which it is connected with the atomizer 67b.

The air or fluid supply conduits for the instruments 62, 66, and 67 are indicated at 62a, 66a, and 67a, respectively, and the cords containing the circuit connections for the cautery 63 and hand piece 64 are indicated at 63a and 64a, respectively, Fig. 10, said conduits and cords each extending downwardly from the holder 34 within a channel-shaped member 69 housed within the column 10 and suitably connected with the base 11 thereof. The inner ends of said conduits and cords are carried upwardly within the column to a point above the channel 69 and each is suitably connected to a hollow member 70, preferably secured to the rear wall of the column, Figs. 2, 3, and 5. The hollow members 70 to which the fluid supply conduits 62a, 66a, and 67a, are connected are in turn connected with a suitable fluid supply source under pressure, not shown. Likewise the members 70 to which the circuit connections of the cords 63a and 74a are extended each is electrically connected with a current supply source, not shown. Each of the conduits or cords connected with the instruments carried by the holder 34 is provided with a counterbalancing weight 71, preferably in the form of a pulley, which is guided by and free to move up and down within one of the channel members 69 when moving the closure 14 to and from open position.

In the operation of the instrument supporting means for the purpose of effecting removal of the instruments from the compartment 13 to position them in advance thereof, it is only necessary for the operator to swing the closure outwardly from the position shown in Fig. 3 to that shown in Fig. 5, during which time the holder 34 will be automatically moved in an outward and upward direction on the closure for the purpose of extending the instruments or the handles thereof above or beyond the closure whereby to render them readily accessible by positioning them in convenient reach of the operator. The movement of the instrument holder outwardly on the closure is effected, as previously stated, by the action of the operating element 25 on the lever 28 which will move the link 32 to elevate the holder to the position shown in Fig. 5. With the holder in this position, the operator may conveniently grasp any one of the instruments he desires to use and readily withdraw it from the holder. It will be understood that when the operator is through using the instruments he will allow them to be returned to normal position on the holder by the pull of the counterbalancing weights or pulleys 71 thereon. Upon completion of the different operations from time to time the closure will be moved to normal position to return the instruments to the compartment 13 for protection when not in use.

It will be understood that the term "instrument" used in the claims may be considered to include the holder therefor, the term being used in this connection in its broadest sense.

The use of the holder is of course made especially advantageous as a means for supporting a plurality of instruments in order that they may all be projected from the compartment for housing the same at one operation merely in response to the opening of the closure for said compartment.

While one embodiment of the invention has been disclosed, it is to be understood that the inventive idea may be carried out in a number of ways. This application is therefore not to be limited to the precise details described, but is intended to cover all variations and modifications thereof falling within the spirit of the invention or the scope of the appended claims.

I claim:

1. A dental apparatus comprising a support, a device movable relative to the support, an instrument movable relative to said device, relatively movable actuating members connecting the instrument to the support and free to swing relative thereto and to the instrument, and an operating connection between said device and one of said members, said connection operating upon moving said device to effect movement of said members to move the instrument relative to said device in a plane substantially parallel to said device.

2. A dental apparatus comprising a support, a device mounted to swing relative thereto, an instrument movable on said device, actuating members connecting the instrument to the support and mounted to swing one on another, and an operating element connected to said device and having a part connected with and adapted to travel on one of said members to actuate said member to effect movement of the instrument on said device upon swinging said device relative to the support.

3. A dental apparatus comprising a support, a device movable on the support, an instrument movable relative to said device, a pair of pivotally connected members one pivotally connected with the support and the other pivotally connected with the instrument, and an operating element connected with one of said members and with said device and actuated by said device on movement thereof to move said members and the instrument relative to said device.

4. A dental apparatus comprising a support, a device movable on the support, an instrument mounted for movement on said device, a pair of pivotally connected members one connected with the support and the other pivotally connected with the instrument, an operating element connected with said device, and means connecting said element with one of said members for movement between predetermined positions thereon to effect operation of said member and movement of the instrument on said device upon movement of said device on the support.

5. A dental apparatus comprising a support, a device movable on the support, an instrument mounted for movement on said device, a lever pivotally connected with the support and having a longitudinally extending slot, link means pivotally connecting the lever with the instrument, an operating arm having one end connected with said device and having a pivot member at its other end movable in said slot to effect operation of the lever, said device upon being moved in one direction operating to move the arm to effect movement of the lever to actuate said link means and to move the instrument on said device, and counterbalancing means connected with said lever.

6. A dental apparatus comprising a support having an opening, a closure for the opening movable on the support, an instrument within the opening movable relative to the closure, relatively movable members within the opening connected for a swinging movement one on another and serving to connect the instrument with the support, and an operating element connected with the closure and with at least one of said members and operating to move said members to move the instrument relative to the closure upon moving the closure to open position.

7. A dental apparatus comprising a support having an opening, a closure for the opening movable on the support, an instrument movable on the closure, pivotally connected members within the opening one pivotally connected with the support and another with the instrument, an operating element connected with the closure and with one of said members and serving to move said members to move the instrument upon the closure upon opening the closure, and counterbalancing means within the opening connected with one of said members.

8. A dental apparatus comprising a support, a device movable on the support between predetermined positions, an instrument holder at one side of said device, supporting means for the holder comprising a part projecting laterally from one side thereof and provided with inner and outer rollers, guide means on said device having inner and outer faces on which said inner and outer rollers are mounted for movement respectively upon movement of the instrument holder relative to said device, and operating means for the holder interposed between said device and said support and actuated by said device to effect movement of the instrument holder relative thereto upon movement of said device between said predetermined positions.

9. A dental apparatus comprising a support having an opening, a closure for the opening movable on the support, an instrument holder at the inner side of the closure, inner and outer rollers carried by the instrument holder, guide means on the closure having inner and outer portions on which said inner and outer rollers are respectively disposed, relatively movable members within the opening connected one with another and serving to connect the holder with the support, and an operating element connected with the closure and with one of said members and operating to move said members to move the holder on the closure upon opening the closure.

10. A dental apparatus comprising a support having an opening, a closure for the opening, an instrument holder within the opening, a guide member on the closure at the inner side thereof and provided with a slot, a supporting member connected with the holder and extending through the slot of said guide member, rollers carried by said supporting member and engaging the opposite faces of said guide member, actuating means for the holder movable on the support within the opening, and an operating element connected with the closure and with said actuating means and operated by the closure upon opening the same to effect movement of the holder relative to the closure.

11. A dental apparatus comprising a support having an opening, a closure for the opening movable on the support, an instrument holder movable on the closure from a normal to a predetermined position, relatively movable members connecting the holder with the support, means connected with the closure and with one of said members and operating to move said members to move the holder to said predetermined position on the closure upon opening the closure, and parts on the closure and holder for cooperation upon moving the holder to said predetermined position to secure it upon the closure.

12. A dental apparatus comprising a support having an opening, a closure for the opening movable on the support, an instrument holder movable on the closure from a normal position to a predetermined service position, relatively movable members serving to connect the holder with the support, means connected with the closure and with one of said members and serving to move said members to move the holder to said predetermined position upon opening the closure, and spring pressed means for cooperation with the holder to secure it at said predetermined position when moved thereto, said spring pressed means being conditioned by the holder upon approaching said predetermined position for operation to engage and secure the holder at said position.

13. In a dental apparatus, a hollow support part having an opening therein, a closure part for said opening, an instrument carrier supported on the inside of said closure part and movable therewith when the closure part is opened, an instrument freely carried by said instrument carrier so that it may be moved with respect thereto, a flexible connection in said support part connected to said instrument for supplying an operating medium thereto, means comprising relatively movable actuating members connecting the instrument carrier to the support and an operating connection between the said closure part and one of said members for moving the carrier forwardly with respect to the closure part simultaneously with the opening of the closure part, said instrument carrier being moved and carrying with it the instrument and the flexible connection thereto upon opening the closure part from a position at rest within the closure to a predetermined position with respect to the closure part, such that the instrument may be conveniently grasped by the operator and the instrument, together with the flexible connection, pulled to a service position.

ALPHONSE F. PIEPER.